(12) United States Patent
Oe et al.

(10) Patent No.: US 10,487,373 B2
(45) Date of Patent: Nov. 26, 2019

(54) STEEL PIPE FOR LINE PIPE AND METHOD OF MANUFACTURING THE SAME

(71) Applicant: NIPPON STEEL & SUMITOMO METAL CORPORATION, Tokyo (JP)

(72) Inventors: Taro Oe, Takaishi (JP); Keiichi Kondo, Izumisano (JP); Hiroki Kamitani, Wakayama (JP); Yuji Arai, Amagasaki (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 15/740,041

(22) PCT Filed: Jun. 23, 2016

(86) PCT No.: PCT/JP2016/068726
§ 371 (c)(1),
(2) Date: Dec. 27, 2017

(87) PCT Pub. No.: WO2017/018108
PCT Pub. Date: Feb. 2, 2017

(65) Prior Publication Data
US 2018/0187278 A1 Jul. 5, 2018

(30) Foreign Application Priority Data

Jul. 27, 2015 (JP) ................................ 2015-148036

(51) Int. Cl.
| | |
|---|---|
| *C21D 9/08* | (2006.01) |
| *C22C 38/00* | (2006.01) |
| *C22C 38/58* | (2006.01) |
| *C21D 1/18* | (2006.01) |
| *C21D 6/00* | (2006.01) |
| *C21D 8/10* | (2006.01) |
| *C22C 38/02* | (2006.01) |
| *C22C 38/04* | (2006.01) |
| *C22C 38/06* | (2006.01) |
| *C22C 38/42* | (2006.01) |
| *C22C 38/44* | (2006.01) |
| *C22C 38/46* | (2006.01) |
| *C22C 38/48* | (2006.01) |
| *C22C 38/50* | (2006.01) |
| *F16L 9/02* | (2006.01) |
| *B21B 1/02* | (2006.01) |
| *B21B 1/04* | (2006.01) |
| *B21B 1/46* | (2006.01) |

(52) U.S. Cl.
CPC .............. *C21D 9/08* (2013.01); *C21D 1/18* (2013.01); *C21D 6/004* (2013.01); *C21D 6/005* (2013.01); *C21D 6/008* (2013.01); *C21D 8/105* (2013.01); *C22C 38/00* (2013.01); *C22C 38/001* (2013.01); *C22C 38/002* (2013.01); *C22C 38/02* (2013.01); *C22C 38/04* (2013.01); *C22C 38/06* (2013.01); *C22C 38/42* (2013.01); *C22C 38/44* (2013.01); *C22C 38/46* (2013.01); *C22C 38/48* (2013.01); *C22C 38/50* (2013.01); *C22C 38/58* (2013.01); *F16L 9/02* (2013.01); *B21B 1/02* (2013.01); *B21B 1/026* (2013.01); *B21B 1/04* (2013.01); *B21B 1/463* (2013.01); *B21B 2001/022* (2013.01); *C21D 2211/002* (2013.01); *C21D 2211/005* (2013.01); *C21D 2211/008* (2013.01)

(58) Field of Classification Search
CPC .. B21B 1/02; B21B 1/026; B21B 1/04; B21B 1/463; B21B 2001/022; C21D 1/18; C21D 2211/002; C21D 2211/005; C21D 2211/008; C21D 6/004; C21D 6/005; C21D 6/008; C21D 8/105; C21D 9/08; C22C 38/00; C22C 38/001; C22C 38/002; C22C 38/02; C22C 38/04; C22C 38/06; C22C 38/42; C22C 38/44; C22C 38/46; C22C 38/48; C22C 38/50; C22C 38/58; F16L 9/02
See application file for complete search history.

(56) References Cited

U.S. PATENT DOCUMENTS

| | | | | |
|---|---|---|---|---|
| 2014/0137992 | A1* | 5/2014 | Ishiguro | ................ C21D 9/085 148/570 |
| 2014/0299236 | A1* | 10/2014 | Anelli | ................... C21D 8/105 148/504 |

FOREIGN PATENT DOCUMENTS

| | | |
|---|---|---|
| CA | 2 920 465 | 2/2015 |
| JP | 2002-173710 | 6/2002 |
| JP | 2004-176172 | 6/2004 |
| JP | 2012-241274 | 12/2012 |
| JP | 2013-032584 | 2/2013 |
| WO | 2013/002418 | 1/2013 |

* cited by examiner

*Primary Examiner* — Jenny R Wu
(74) *Attorney, Agent, or Firm* — Clark & Brody

(57) ABSTRACT

A steel pipe for line pipe has a composition of, in mass %: C: 0.02 to 0.11%; Si: 0.05 to 1.0%; Mn: 0.30 to 2.5%; P: up to 0.030%; S: up to 0.006%; Cr: 0.05 to 0.36%; Mo: 0.02 to 0.33%; V: 0.02 to 0.20%; Ti: 0.001 to 0.010%; Al: 0.001 to 0.100%; N: up to 0.008%; Ca: 0.0005 to 0.0040%; and other elements and satisfies Cr+Mo+V≤0.40, the chemical symbols in the equation substituted by the content of the corresponding element in mass %. The pipe contains tempered martensite and/or tempered bainite and further contains ferrite in at least one of a portion between a steel pipe outer surface and a depth of 1 mm from the outer surface, and a portion between a steel pipe inner surface and a depth of 1 mm from the inner surface.

20 Claims, 4 Drawing Sheets

TEMPERED MARTENSITE OR TEMPERED BAINITE

TEMPERED MARTENSITE OR TEMPERED BAINITE

MICROSTRUCTURE CONTAINING FERRITE

STEEL PIPE FOR LINE PIPE AND METHOD OF MANUFACTURING THE SAME

TECHNICAL FIELD

The present invention relates to a steel pipe for line pipe and a method of manufacturing the same.

BACKGROUND ART

As demands for energy have increased in recent years, oil wells and gas wells are being more widely developed in corrosive environments in which development has not been very frequently done. Line pipe for use in such corrosive environments is required to have a good corrosion resistance.

ISO15156 specifies that the hardness of carbon-steel line pipe that is required to have sulfide stress corrosion cracking resistance (SSC resistance) should be maintained at or below 250 Hv. Further, to provide a certain safety margin, the hardness may sometimes be required to be maintained at a level lower than 250 Hv.

JP 2013-32584 A describes (1) promoting surface decarburization in a quench furnace to reduce the hardness of a surface layer portion, (2) performing quenching in a film boiling condition to reduce cooling rate, thereby reducing the hardness of surface layer portions, and (3) after quenching, grinding a surface layer which is a high-hardness portion.

JP 2002-173710 A describes a method of manufacturing a steel plate having a small added amount of expensive alloying elements and exhibiting good low-temperature toughness and a yield strength not lower than 690 N/mm$^2$.

DISCLOSURE OF THE INVENTION

The method described in JP 2013-32584 A requires special heat treatment equipment and steps, which makes it disadvantageous in terms of production efficiency.

Another method for reducing the hardness of surface layer portions may be to temper at a high temperature for a long time. However, tempering at a high temperature for a long time is disadvantageous in terms of production efficiency.

An object of the present invention is to provide a steel pipe for line pipe with reduced hardness of a surface layer portion.

A steel pipe for line pipe according to an embodiment of the present invention has a chemical composition of in mass %: C: 0.02 to 0.11%; Si: 0.05 to 1.0%; Mn: 0.30 to 2.5%; P: up to 0.030%; S: up to 0.006%; Cr: 0.05 to 0.36%; Mo: 0.02 to 0.33%; V: 0.02 to 0.20%; Ti: 0.001 to 0.010%; Al: 0.001 to 0.100%; N: up to 0.008%; Ca: 0.0005 to 0.0040%; Cu: 0 to 1.5%; Ni: 0 to 1.5%; Nb: 0 to 0.05%; and balance Fe and impurities, the chemical composition satisfying Equation (1) below, the steel pipe having a microstructure containing tempered martensite and/or tempered bainite and further containing ferrite in at least one of a portion between an outer surface of the steel pipe and a depth of 1 mm from the outer surface, and a portion between an inner surface of the steel pipe and a depth of 1 mm from the inner surface, $$Cr+Mo+V \leq 0.40 \qquad (1),$$

wherein each of the chemical symbols in equation (1) is substituted for by the content of the corresponding element in mass %.

A method of manufacturing a steel pipe for line pipe according to an embodiment of the present invention includes: preparing a hollow shell having a chemical composition of, in mass %: C: 0.02 to 0.11%; Si: 0.05 to 1.0%; Mn: 0.30 to 2.5%; P: up to 0.030%; S: up to 0.006%; Cr: 0.05 to 0.36%; Mo: 0.02 to 0.33%; V: 0.02 to 0.20%; Ti: 0.001 to 0.010%; Al: 0.001 to 0.100%; N: up to 0.008%; Ca: 0.0005 to 0.0040%; Cu: 0 to 1.5%; Ni: 0 to 1.5%; Nb: 0 to 0.05%; and balance Fe and impurities; quenching the hollow shell such that at least one of a maximum Vickers hardness of a portion between an outer surface of the hollow shell and a depth of 1 mm from the outer surface, and a maximum Vickers hardness of a portion between an inner surface of the hollow shell and a depth of 1 mm from the inner surface is not lower than 310 Hv; and tempering the quenched hollow shell, the chemical composition satisfying Equation (1) below, $$Cr+Mo+V \leq 0.40 \qquad (1),$$

wherein each of the chemical symbols in equation (1) is substituted for by the content of the corresponding element in mass %.

The present invention provides a steel pipe for line pipe with reduced hardness of a surface layer portion.

EMBODIMENTS FOR CARRYING OUT THE INVENTION

One approach that has been proposed to reduce the hardness of the surface layer portion of a steel pipe for line pipe is to control quenching to prevent the surface layer portion from becoming too hard. However, this approach may require special quenching equipment or a special process. The present inventors attempted to find a different approach to reducing the hardness of a steel pipe for line pipe. The inventors found a method of reducing hardness by forming ferrite in a surface layer portion.

Figure 1:
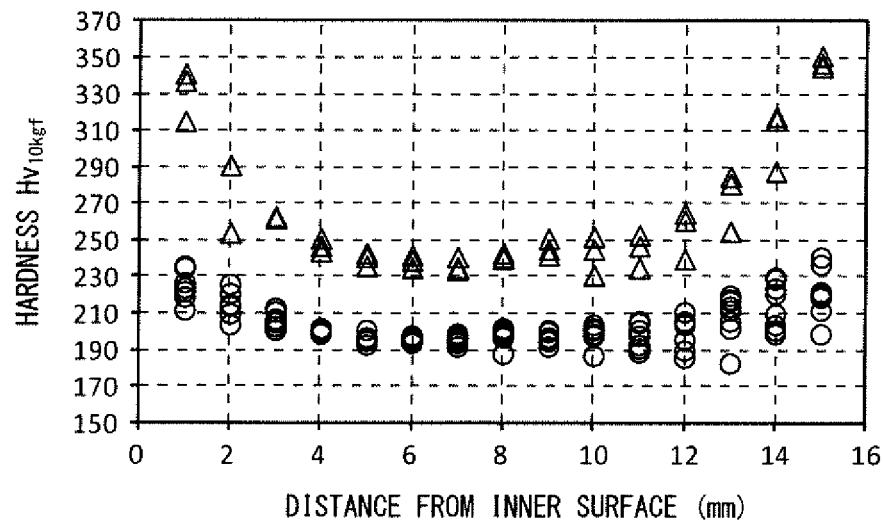
FIG. 1 shows a hardness distribution in a steel pipe having a total content of Cr, Mo and V of 0.44 mass %, along the wall thickness.
Figure 2:
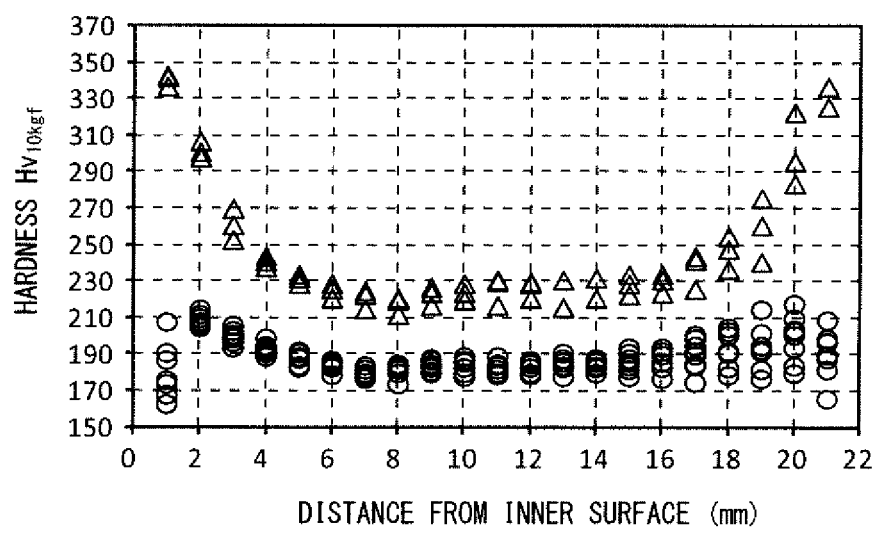
FIG. 2 shows a hardness distribution in a steel pipe having a total content of Cr, Mo and V of 0.35 mass %, along the wall thickness.

FIGS. 1 and 2 show hardness distributions of two steel pipes for line pipe with different chemical compositions, along the wall thickness. The steel pipe of FIG. 1 is a steel pipe having a total content of Cr, Mo and V of 0.44 mass %, and the steel pipe of FIG. 2 is a steel pipe of a total component of Cr, Mo and V of 0.35 mass %. The steel pipe of FIG. 1 has an outer diameter of 273.1 mm and a wall thickness of 16.0 mm, and the steel pipe of FIG. 2 has an outer diameter of 273.11 mm and a wall thickness of 22.0 mm. These steel pipes have a yield strength of X65 in accordance with the American Petroleum Institute (API) standard.

These steel pipes were produced by performing the same heat treatment. More specifically, these steel pipes were produced by performing quenching by immersing them in a cooling pool (the temperature of the cooling water was about 30° C.) to rapidly cooling them from 950° C., and then performing tempering by soaking them at 650° C. for 90 minutes. In FIGS. 1 and 2, "Δ" indicates the hardness of a steel pipe after quenching and before tempering (hereinafter referred to as as-quenched material), and "○" indicates the hardness of a steel pipe after tempering.

As shown in FIGS. 1 and 2, in each as-quenched material, a surface layer portion where the cooling rate was high had a high hardness. More specifically, a portion between the inner surface and a depth of about 1 mm from the inner surface and a portion between the outer surface and a depth of about 1 mm from the outer surface had high hardnesses.

In the steel pipe of FIG. 1, the tendency of the hardness of a surface layer portion to be high was retained after tempering. On the other hand, in the steel pipe of FIG. 2, the hardness of a surface layer portion after tempering significantly decreased even though tempering was performed under the same conditions as the steel pipe of FIG. 1.

Figure 3A:
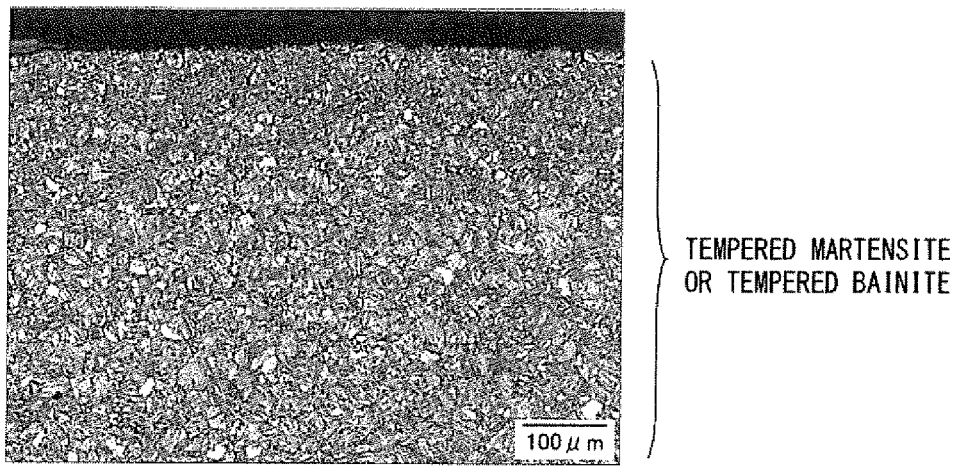
FIG. 3A is a picture of an enlarged cross section of a portion of the steel pipe of FIG. 1 near an outer surface.
Figure 3B:
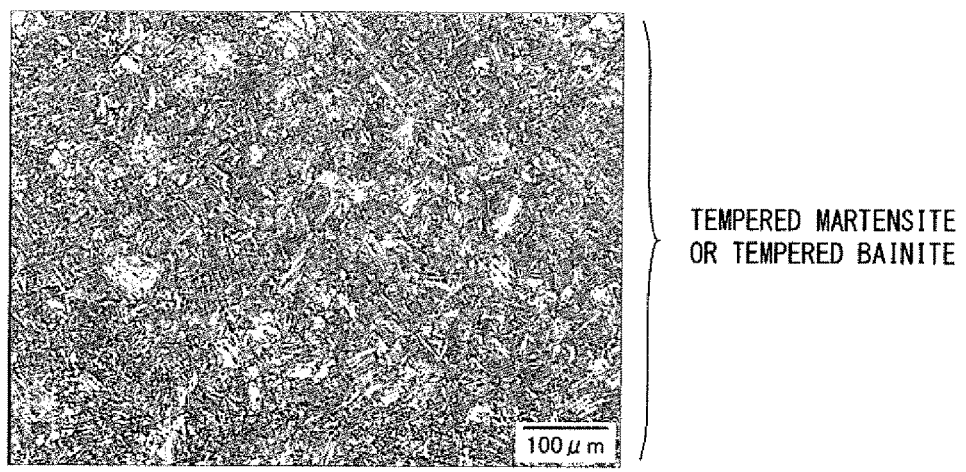
FIG. 3B is a picture of an enlarged cross section of a portion of the steel pipe of FIG. 1 at a depth of 1 mm from an outer surface in the thickness direction.
Figure 4A:
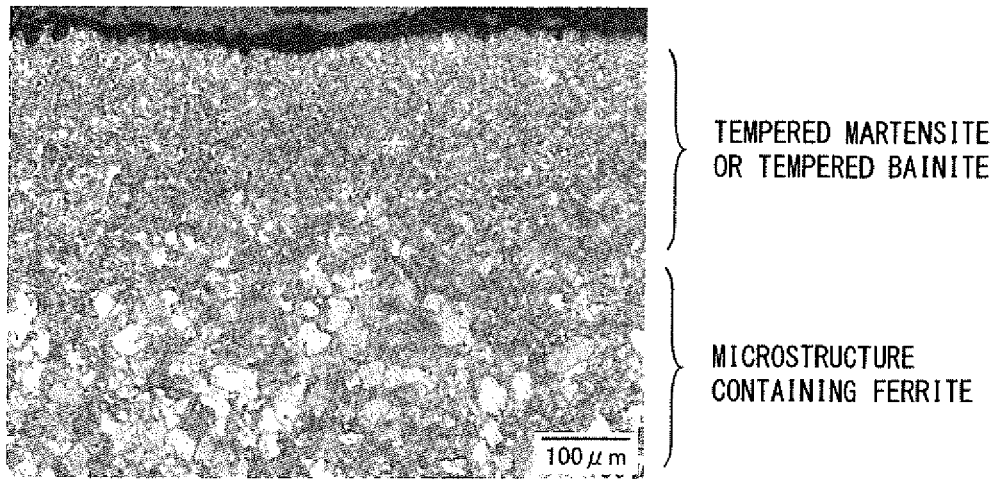
FIG. 4A is a picture of an enlarged cross section of a portion of the steel pipe of FIG. 2 near an outer surface.
Figure 4B:
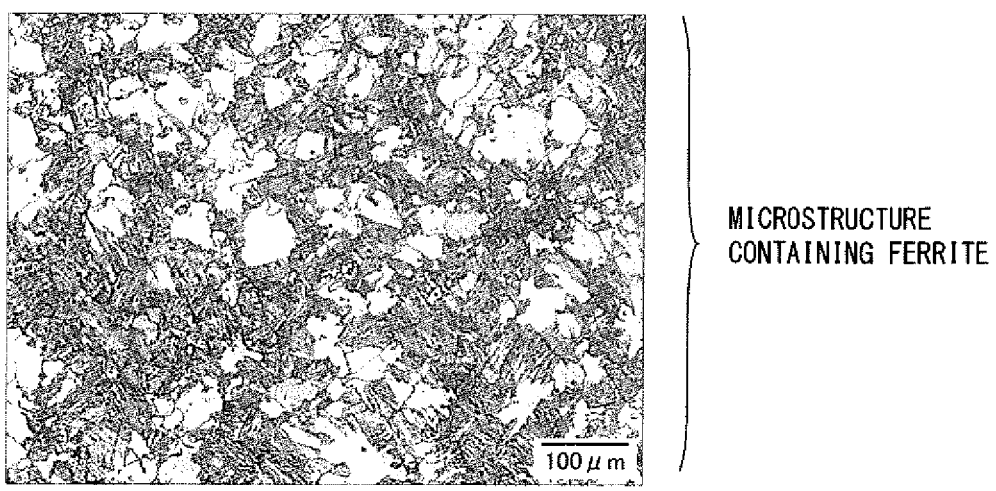
FIG. 4B is a picture of an enlarged cross section of a portion of the steel pipe of FIG. 2 at a depth of 1 mm from an outer surface in the thickness direction.

FIGS. 3A and 3B and 4A and 4B are pictures of enlarged cross sections of outer surfaces of the steels pipes of FIGS. 1 and 2 and portions near the outer surfaces. FIGS. 3A and 4A are pictures of cross sections of portions including the outer surfaces of the steels, and FIGS. 3B and 4B are pictures of cross sections of portions of the steels at a depth of 1 mm from the outer surfaces in the wall thickness direction. The pictures of FIGS. 3A and 3B and 4A and 4B were each obtained by etching a cross section perpendicular to the axial direction of the steel pipe using a nital solution and observing it by optical microscopy.

The steel pipes of FIGS. 3A and 3B each had a microstructure made up of uniform tempered martensite or tempered bainite. On the other hand, the steel pipes of FIGS. 4A and 4B each had an outermost surface layer of a microstructure made of tempered martensite or tempered bainite and inner portions (starting at a depth of about 0.2 mm from the outer surface toward the interior as measured in the wall thickness direction) made of tempered martensite or tempered bainite and ferrite (crystal particles appearing whitish compared with tempered martensite and tempered bainite).

A comparison of the microstructures at a depth of 1 mm from the outer surfaces shown in FIGS. 3B and 4B demonstrates that FIG. 3B shows a microstructure containing no ferrite (i.e. the area ratio of ferrite being 0%) while FIG. 4B shows a microstructure containing ferrite (i.e. the area ratio of ferrite being 40%).

Figure 4C:
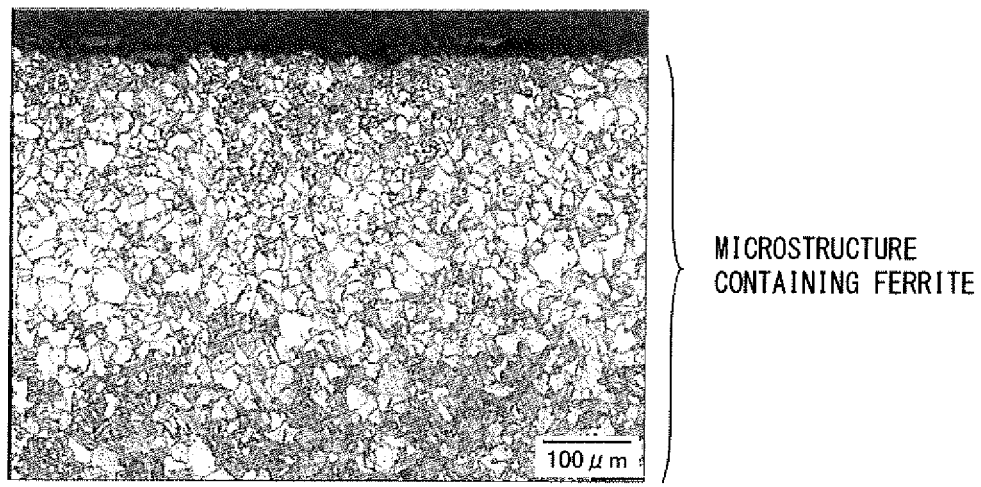
FIG. 4C is a picture of an enlarged cross section of a portion of another steel pipe produced by the same method as that for FIG. 2, near an outer surface.

Some steel pipes exhibiting hardness distributions similar to that of FIG. 2 had microstructures containing ferrite extending all the way to the outermost surface layer, as shown in FIG. 4C.

The surface layer portions in FIG. 2 had reduced hardness presumably because of this presence of ferrite.

The present inventors did further research on the hardness reduction due to the presence of ferrite in a surface layer portion. The inventors found that ferrite is formed after tempering if the chemical composition satisfies Equation (1) below and the hardness of a surface layer portion of an as-quenched material is not lower than 310 Hv.

$$Cr+Mo+V \leq 0.40 \tag{1}$$

wherein each of the chemical symbols in equation (1) is substituted for by the content of the corresponding element in mass %.

Further, it was found that, if the above conditions are met, ferrite is formed after tempering even when tempering conditions with a relatively small operation load are employed. More specifically, it was found that ferrite is formed after tempering even when tempering is performed where the tempering parameter TP defined by Equation (2) below is not higher than 18800, $$TP=(T+273)\times(20+\log(t)) \tag{2}$$

where T is the tempering temperature and t is the holding time for that temperature. The unit of T is ° C. and the unit of t is the hour.

The present invention was made based on the above findings. A steel pipe for line pipe according to an embodiment of the present invention will be described below in detail. In the description below, a region between an outer surface of a steel pipe and a depth of 1 mm from the outer surface in the wall thickness direction of the steel pipe will be referred to as "outer surface layer portion" of the steel pipe. Similarly, a region between an inner surface of a steel pipe and a depth of 1 mm from the inner surface will be referred to as "inner surface layer portion" of the steel pipe. Sometimes, outer and inner surface layer portions will not be distinguished and will be simply referred to as "surface layer portion".

[Chemical Composition]

The steel pipe for line pipe according to the present embodiment has the chemical composition described below. In the description below, "%" for the content of an element means mass %.

C: 0.02 to 0.11%

Carbon (C) increases the strength of steel. This effect is not sufficiently present the C content is lower than 0.02%. On the other hand, if the C content exceeds 0.11%, the toughness of the steel decreases. In view of this, the C content should be in the range of 0.02 to 0.11%. To define a lower limit, the C content is preferably higher than 0.02%, and more preferably not lower than 0.04%. To define an upper limit, the C content is preferably not higher than 0.10%, and more preferably not higher than 0.08%.

Si: 0.05 to 1.0%

Silicon (Si) deoxidizes steel. This effect is significant if the Si content is not lower than 0.05%. However, if the Si content exceeds 1.0%, the toughness of the steel decreases. In view of this, the Si content should be in the range of 0.05 to 1.0%. To define a lower limit, the Si content is preferably higher than 0.05%, more preferably not lower than 0.08%, and yet more preferably not lower than 0.10%. To define an upper limit, the Si content is preferably lower than 1.0%, more preferably not higher than 0.50%, and yet more preferably not higher than 0.25%.

Mn: 0.30 to 2.5%

Manganese (Mn) increases the hardenability of steel and increases the strength of the steel. These effects are not sufficiently present if the Mn content is lower than 0.30%. On the other hand, if the Mn content exceeds 2.5%, Mn segregates in the steel, decreasing the toughness of the steel. In view of this, the Mn content should be in the range of 0.30 to 2.5%. To define a lower limit, the Mn content is preferably higher than 0.30%, more preferably not lower than 1.0%, and more preferably not lower than 1.3%. To define an upper limit, the Mn content is preferably lower than 2.5%, more preferably not lower than 2.0%, and yet more preferably not higher than 1.8%.

P: Up to 0.030%

Phosphorus (P) is an impurity. P decreases the toughness of steel. Thus, the lower the P content, the better. In view of this, the P content should be not higher than 0.030%. The P content is preferably lower than 0.030%, more preferably not higher than 0.015%, and more preferably not higher than 0.012%.

S: Up to 0.006%

Sulphur (S) is an impurity. S bonds to Mn to form coarse MnS particles, decreasing the toughness and hydrogen-induced cracking resistance (HIC resistance) of the steel. Thus, the lower the S content, the better. In view of this, the S content should be not higher than 0.006%. The S content is preferably lower than 0.006%, more preferably not higher than 0.003%, and more preferably not higher than 0.002%.

Cr: 0.05 to 0.36%

Chromium (Cr) increases the hardenability of steel and increases the strength of the steel. Further, Cr increases the temper softening resistance of the steel. These effects are not sufficiently present if the Cr content is lower than 0.05%. On the other hand, if the Cr content exceeds 0.36%, Equation (1) cannot be satisfied. In view of this, the Cr content should be in the range of 0.05 to 0.36%. To define a lower limit, the Cr content is preferably higher than 0.05%, and more preferably not lower than 0.10%. To define an upper limit, the Cr content is preferably not higher than 0.30%, and more preferably not higher than 0.20%.

Mo: 0.02 to 0.33%

Molybdenum (Mo) improves the strength of steel through transformation toughening and solute strengthening. These effects are not sufficiently present if the Mo content is lower than 0.02%. On the other hand, if the Mo content exceeds 0.33%, Equation (1) cannot be satisfied. In view of this, the Mo content should be in the range of 0.02 to 0.33%. To define a lower limit, the Mo content is preferably higher than 0.02%, and more preferably not lower than 0.05%. To define an upper limit, the Mo content is preferably not higher than 0.30%, and more preferably not higher than 0.20%.

V: 0.02 to 0.20%

Vanadium (V) bonds to C in steel to form a V carbide, increasing the strength of the steel. These effects are not sufficiently present if the V content is lower than 0.02%. On the other hand, if the V content is higher than 0.20%, carbide particles become coarse, decreasing the toughness of the steel. In view of this, the V content should be in the range of 0.02 to 0.20%. To define a lower limit, the V content is preferably higher than 0.02%, and more preferably not lower than 0.04%. To define an upper limit, the V content is preferably lower than 0.20%, and more preferably not higher than 0.10%.

Ti: 0.001 to 0.010%

Titanium (Ti) bonds to N in steel to form TiN, preventing the reduction in the toughness of the steel due to dissolved N. Further, fine TiN particles that have precipitated in a dispersed manner increase the toughness of the steel. These effects are not sufficiently present if the Ti content is lower than 0.001%. On the other hand, if the Ti content is higher than 0.010%, TiN particles become coarse or coarse TiC particles are produced, decreasing the toughness of the steel. In view of this, the Ti content is in the range of 0.001 to 0.010%. To define a lower limit, the Ti content is preferably higher than 0.001%, and more preferably not lower than 0.002%. To define an upper limit, the Ti content is preferably not higher than 0.009%.

Al: 0.001 to 0.100%

Aluminum (Al) bonds to N to form fine nitride particles, increasing the toughness of the steel. These effects are not sufficiently present if the Al content is lower than 0.001%. On the other hand, if the Al content is higher than 0.100%, Al nitride particles become coarse, decreasing the toughness of the steel. In view of this, the Al content should be in the range of 0.001 to 0.100%. To define a lower limit, the Al content is preferably higher than 0.001%, and more preferably not lower than 0.010%. To define an upper limit, the Al content is preferably lower than 0.100%, more preferably not higher than 0.080%, and yet more preferably not higher than 0.060%. As used herein, Al content means the content of acid-soluble Al (so-called Sol-Al).

N: Not Higher than 0.008%

Nitrogen (N) bonds to Al to form fine particles of an Al nitride, increasing the toughness of the steel. These effects are sufficiently present if a small amount of N is contained. On the other hand, if the N content is higher than 0.008%, dissolved N decreases the toughness of the steel. Further, if the N content is too high, carbonitride particles become coarse, decreasing the toughness of the steel. In view of this, the N content should be not higher than 0.008%. To define a lower limit, the N content is preferably not lower than 0.002%. To define an upper limit, the N content is preferably lower than 0.008%, more preferably not higher than 0.006%, and more preferably not higher than 0.005%.

Ca: 0.0005 to 0.0040%

Calcium (Ca) bonds to S in steel to form CaS. As CaS is formed, MnS is prevented from being formed. As such, Ca increases the toughness and HIC resistance of the steel. These effects are not sufficiently present if the Ca content is lower than 0.0005%. On the other hand, if the Ca content is higher than 0.0040%, the index of cleanliness of the steel decreases, decreasing the toughness and HIC resistance of the steel. In view of this, the Ca content should be in the range of 0.0005 to 0.0040%. To define a lower limit, the Ca content is preferably higher than 0.0005%, more preferably not lower than 0.0008%, and yet more preferably not lower than 0.0010%. To define an upper limit, the Ca content is preferably lower than 0.0040%, more preferably not higher than 0.0030%, and yet more preferably not higher than 0.0025%.

The balance of the chemical composition of the steel pipe for line pipe according to the present embodiment is made of Fe and impurities. Impurity in this context means an element originating from ore or scraps used as a raw material of steel or an element that has entered from the environment or the like during the manufacturing process.

In the chemical composition of the steel pipe for line pipe according to the present embodiment, some of the Fe may be replaced by one or more elements selected from the group consisting of Cu, Ni and Nb. Cu, Ni and Nb increase the strength of the steel. Cu, Ni and Nb are optional elements. That is, the chemical composition of the steel pipe for line pipe according to the present embodiment may contain just some of Cu, Ni and Nb, or may contain none of them.

Cu: 0 to 1.5%

Copper (Cu) increases the hardenability of steel and increases the strength of the steel. These effects are present if a small amount of Cu is contained. On the other hand, if the Cu content is higher than 1.5%, the weldability of the steel decreases. Further, if the Cu content is too high, the grain-boundary strength of the steel at high temperature decreases, decreasing the hot workability of the steel. In view of this, the Cu content is in the range of 0 to 1.5%. To define a lower limit, the Cu content is preferably not lower than 0.05%, and more preferably not lower than 0.08%. To define an upper limit, the Cu content is preferably lower than 1.5%, more preferably not higher than 0.5%, and more preferably not higher than 0.3%.

Ni: 0 to 1.5%

Nickel (Ni) increases the hardenability of steel and increases the strength of the steel. These effects are present if a small amount of Ni is contained. On the other hand, if the Ni content is higher than 1.5%, the SSC resistance decreases. In view of this, the Ni content is in the range of 0 to 1.5%. To define a lower limit, the Ni content is preferably not lower than 0.05%, and more preferably not lower than 0.08%. To define an upper limit, the Ni content is preferably lower than 1.0%, more preferably not higher than 0.5%, and yet more preferably not higher than 0.3%.

Nb: 0 to 0.05%

Niobium (Nb) bonds to C and/or N in steel to form fine particles of an Nb carbide, increasing the strength and toughness of the steel. Further, Nb dissolves in an Mo carbide, preventing Mo carbide particles from becoming coarse. These effects are present if a small amount of Nb is contained. On the other hand, if the Nb content is higher than 0.05%, carbide particles become coarse, decreasing the toughness of the steel. In view of this, Nb content should be in the range of 0 to 0.05%. To define a lower limit, the Nb content is preferably not lower than 0.001%. To define an upper limit, the Nb content is preferably not higher than 0.02%, and more preferably not higher than 0.01%.

The chemical composition of the steel pipe for line pipe according to the present embodiment satisfies Equation (1) below:

$$Cr+Mo+V \leq 0.40 \qquad (1),$$

wherein each of the chemical symbols in equation (1) is substituted for by the content of the corresponding element in mass %.

If the left side of Equation (1) is larger than 0.40, ferrite is not formed under conditions with small operation load (TP≤18800). No clear reasons for this have been given, but it is estimated that the ferrite in a surface layer portion in the present embodiment is formed due to recrystallization during tempering, as discussed further below. This is presumably because, if the Cr, Mo and V contents are high, carbides of these elements that precipitate during tempering prevent recrystallization.

[Microstructure]

The microstructure of the steel pipe for line pipe according to the present embodiment contains tempered martensite and/or tempered bainite, and surface layer portions further contain ferrite. It is noted that tempered martensite and tempered bainite are difficult to distinguish when observed by optical microscopy discussed below. They will not be treated separately in the present embodiment.

A steel pipe for line pipe is produced by quenching and tempering. Usually, surface layer portions, where the cooling rate is high during quenching, can easily get a higher hardness than other portions. According to the present embodiment, surface layer portions are made of a microstructure containing ferrite, thereby decreasing the hardness of surface layer portions where the hardness can easily get higher.

This effect is not impaired even in a microstructure where not only surface layer portions but also portions located inwardly of the surface layer portions in the wall thickness direction contain ferrite. Thus, in the microstructure of the steel pipe for line pipe, not only surface layer portions but also portions located inwardly of the surface layers portions may contain ferrite. However, when excess ferrite is contained, this decreases the strength of the steel pipe. Thus, especially in a steel pipe with a relatively small wall thickness, it is preferable that ferrite is present only in surface layer portions. More specifically, it is preferable that the microstructure of the central portion of the steel pipe as measured in the wall thickness (i.e. the portion between a depth of 2 mm from the inner surface and a depth of 2 mm from the outer surface) is essentially composed of tempered martensite and/or tempered bainite.

In the microstructure of the steel pipe for line pipe according to the present embodiment, at least one of an outer surface layer portion and an inner surface layer portion suitably contains ferrite. Depending on the manufacturing equipment for the steel pipe for line pipe and the method of quenching, the difference between the hardness of the inner surface layer portion and the hardness of the outer surface layer portion may be large. As such, the required properties may be provided if the hardness of the one of the inner and outer surface layer portions that has a higher hardness is reduced.

In the microstructure of the steel pipe for line pipe according to the present embodiment, at least one of the area ratio of ferrite at a depth of 1 mm from the outer surface and the area ratio of ferrite at a depth of 1 mm from the inner surface is preferably not lower than 5%.

The microstructure in surface layer portions may be observed and the area ratio of ferrite at a depth of 1 mm from a surface (i.e. outer or inner surface) may be measured in the following manner.

A test specimen for microstructure observation is extracted from a portion of a steel pipe including a surface. The test specimen is polished, where a surface perpendicular to the axial direction of the steel pipe provides the polished face, and is etched by a nital solution. The etched surface is observed by optical microscopy (magnified by 100 times). At this time, ferrite is observed as particles that are whitish compared with tempered martensite or tempered bainite.

Such observation is conducted where the center of a field of vision is at a depth of 1 mm from the surface, and the proportion of the area in the field of vision for observation (1 mm$^2$) that is represented by ferrite is determined. For each steel pipe, such observation is conducted at eight locations arranged in the circumferential direction (separated by 45°). The proportions of the areas in the 8 fields of vision represented by ferrite are averaged to determine the area ratio of ferrite at a depth of 1 mm from the surface.

It is preferable that the remainder of the microstructure of the steel pipe for line pipe according to the present embodiment is mainly composed of tempered martensite and/or tempered bainite. More specifically, it is preferable that the proportion of the microstructure portions other than ferrite represented by tempered martensite and/or tempered bainite is 90% or higher. That is, it is preferable that the value of (area of tempered martensite and tempered bainite/(area of field of vision-area of ferrite)) is 90% or higher. More preferably, the proportion of the microstructure portions other than ferrite represented by tempered martensite and/or tempered bainite is 95% or higher.

[Vickers Hardness and Yield Strength]

In the steel pipe for line pipe according to the present embodiment, the Vickers hardness of a portion between a depth of 1 mm from the inner surface and a depth of 1 mm from the outer surface in the wall thickness direction is preferably not higher than 230 Hv. More specifically, in the steel pipe for line pipe according to the present embodiment, the Vickers hardness of a portion at any position between a depth of 1 mm from the inner surface and a depth of 1 mm from the outer surface, as measured in accordance with JIS Z 2244, is not higher than 230 Hv.

Preferably, the steel pipe for line pipe according to the present embodiment has a yield strength that is not lower than 415 MPa. More preferably, the steel pipe for line pipe according to the present embodiment has a yield strength that is not lower than 450 MPa.

The steel pipe for line pipe according to the present embodiment is preferably a seamless steel pipe.

[Manufacturing Method]

A method of manufacturing a steel pipe for line pipe according to an embodiment of the present invention will be described below. The manufacturing method according to the present embodiment includes the step of preparing a hollow shell, the step of quenching the hollow shell, and the step of tempering the quenched hollow shell.

[Step of Preparing Hollow Shell]

A hollow shell having the chemical composition described above is prepared. The hollow shell may be a seamless steel pipe or a welded steel pipe. A method of manufacturing a seamless steel pipe will be described as an example. A steel having the chemical composition described above is produced by smelting and is refined. Subsequently, continuous casting produces a billet from the steel melt. Alternatively, a slab or bloom may be produced from the steel melt and the slab or bloom may be hot-worked to produce a billet. The billet is hot-worked to produce a seamless steel pipe. More specifically, piercing-rolling, elongation-rolling and sizing are performed to produce a seamless steel pipe.

[Step of Quenching]

The hollow shell is quenched. Quenching is performed such that at least one of the maximum Vickers hardness of a portion between the outer surface of the hollow shell and a depth of 1 mm from the outer surface (hereinafter referred to as maximum hardness of the outer surface layer portion) and the maximum Vickers hardness of a portion between the inner surface of the hollow shell and a depth of 1 mm from the inner surface (hereinafter referred to as maximum hardness of the inner surface layer portion) is 310 Hv or higher.

If the maximum hardness of the outer surface layer portion of the hollow shell after quenching is 310 Hv or higher, ferrite is formed in the outer surface layer portion after tempering. Similarly, if the maximum hardness of the inner surface layer portion of the hollow shell after quenching is 310 Hv or higher, ferrite is formed in the inner surface layer portion after tempering. No clear reasons for this have been given, but it is estimated that, as the surface layer portions are rapidly cooled, a large number of distortions which provide a driving force for ferrite precipitation are introduced, causing recrystallization to proceed.

Preferably, quenching is performed such that at least one of the maximum hardness of the outer surface layer portion of the hollow shell and the maximum hardness of the inner surface layer portion of the hollow shell is 315 Hv or higher.

It should be noted that, in order to verify that the maximum hardness of the outer surface layer portion and the maximum hardness of the inner surface layer portion are 310 Hv or higher, it is not necessary to identify the position at which the Vickers hardness is at its maximum. That is, if the Vickers hardness is measured at several positions in the outer surface layer portion and these positions include those at which the Vickers hardness is 310 Hv or higher, it can be concluded that the maximum hardness of the outer surface layer portion is 310 Hv or higher. Similarly, if the Vickers hardness is measured at several positions in the inner surface layer portion and these positions include those at which the Vickers hardness is 310 Hv or higher, it can be concluded that the maximum hardness of the inner surface layer portion is 310 Hv or higher.

The maximum hardness of the outer surface layer portion and the maximum hardness of the inner surface layer portion of the quenched hollow shell can be adjusted by the cooling rate for quenching. Generally, the higher the cooling rate, the higher the hardness after quenching becomes. How easily quenching hardening can be done varies depending on the chemical composition of the hollow shell. However, the quenching conditions that achieve a maximum hardness of 310 Hv or higher can be estimated based on the continuous cooling transformation curve (CCT curve) of the material, for example.

As long as the above conditions are met, the method of quenching is not limited. The quenching may be, for example, immersion quenching where the hollow shell is immersed in a cooling pool, or quenching using a laminar cooling device that blows a refrigerant to one or both of the inner and outer surfaces of the steel pipe. If the hollow shell is a seamless steel pipe, direct quenching where the pipe is rapidly cooled immediately after hot working, in-line quenching where the pipe is subjected to supplementary heating in a supplementary-heating furnace after hot working and is then rapidly cooled, or off-line quenching where the pipe is cooled to room temperature after hot working and is then reheated and rapidly cooled, may be performed.

If immersion quenching is used, the maximum hardness of the outer surface layer portion and the maximum hardness of the inner surface layer portion of the hollow shell can be adjusted by the amount and temperature of the refrigerant, the presence or non-presence of descaling, and stirring or non-stirring in the cooling pool, for example. If quenching is performed by a laminar cooling device, the maximum hardness of the outer surface layer portion and the maximum hardness of the inner surface layer portion of the hollow shell can be adjusted by the amount and temperature of the refrigerant, air-to-water ratio and the presence or non-presence of descaling, for example.

[Step of Tempering]

The quenched hollow shell is tempered. The conditions of tempering are not particularly limited. If a hollow shell that has been quenched under the above conditions is tempered, ferrite is formed in the surface layer portion even if no special condition is met.

To reduce operation load, it is preferable if the tempering parameter TP defined by Equation (2) below is not higher than 18800, $$TP=(T+273)\times(20+\log(t)) \qquad (2),$$

where T is the tempering temperature and t is the holding time for that temperature. The unit of T is ° C. and the unit of t is the hour.

The lower limit of the tempering parameter TP is not particularly limited; however, if the tempering temperature is too low or the tempering time is too short, ferrite is not formed in the surface layer portion. The lower limit of the tempering parameter TP is preferably 18000, and more preferably 18500. The tempering temperature is not particularly limited, however, it is preferably not lower than 500° C. and not higher than $Ac_1$ point, and more preferably not lower than 600° C. and not higher than $Ac_1$. The holding time is not particularly limited, however, it is preferably not shorter than 90 minutes, and more preferably not shorter than 120 minutes.

Embodiments of the present invention have been described. The above-described embodiments are merely examples for carrying out the present invention. Therefore, the present invention is not limited to the above-described embodiments, and the above-described embodiments can be modified as necessary without departing from the spirit of the present invention.

EXAMPLES

The present invention will now be described in more detail by means of Examples. The present invention is not limited to these Examples.

Steels with the chemical compositions of materials 1 to 7 shown in Table 1 were produced by smelting in a converter, and round billets were produced by continuous casting. "—" in Table 1 indicates that the content of the associated element was at an impurity level.

Quenching was performed by reheating the seamless steel pipes to the temperatures listed in the column labeled "Quenching temp." in Table 2 and then immersing them in a cooling pool. The seamless steel pipes for which the "Quenching condition" was "high-speed cooling" in Table 2 were subjected to oxided scale removal (descaling) after reheating and before immersing, and, during immersing, stirring was performed in the cooling pool. For the seamless steel pipes for which the "Quenching condition" was "low-speed cooling" in Table 2, descaling and stirring in the cooling pool were not performed.

After quenching, test specimens for hardness measurement were extracted from the seamless steel pipes before tempering, and the Vickers hardness of each of portions of the steel pipes at depths of 1 mm, 2 mm and 3 mm from the outer surface and portions of the steel pipes at depths of 1

TABLE 1

| | Chemical composition (in mass %, balance Fe and impurities) | | | | | | | | | | | | | | | |
|---|---|---|---|---|---|---|---|---|---|---|---|---|---|---|---|---|
| Material | C | Si | Mn | P | S | Cu | Cr | Ni | Mo | Ti | V | Nb | Sol-Al | Ca | N | Cr + Mo + V |
| 1 | 0.063 | 0.26 | 1.32 | 0.008 | 0.0013 | — | 0.16 | — | 0.04 | 0.009 | 0.04 | 0.001 | 0.033 | 0.0022 | 0.0038 | 0.24 |
| 2 | 0.058 | 0.13 | 1.45 | 0.009 | 0.0017 | 0.08 | 0.27 | 0.09 | 0.07 | 0.008 | 0.05 | — | 0.030 | 0.0015 | 0.0031 | 0.39 |
| 3 | 0.060 | 0.13 | 1.51 | 0.011 | 0.0014 | 0.20 | 0.25 | 0.20 | 0.08 | 0.008 | 0.06 | 0.001 | 0.037 | 0.0024 | 0.0041 | 0.39 |
| 4 | 0.062 | 0.13 | 1.50 | 0.010 | 0.0014 | 0.20 | 0.28 | 0.21 | 0.09 | 0.005 | 0.05 | — | 0.028 | 0.0008 | 0.0034 | 0.42 |
| 5 | 0.050 | 0.29 | 1.34 | 0.008 | 0.0016 | — | 0.26 | 0.07 | 0.22 | 0.008 | 0.06 | 0.001 | 0.043 | 0.0019 | 0.0032 | 0.54 |
| 6 | 0.060 | 0.15 | 1.31 | 0.009 | 0.0012 | — | 0.25 | — | 0.12 | 0.009 | 0.05 | 0.001 | 0.041 | 0.003 | 0.0046 | 0.42 |
| 7 | 0.060 | 0.14 | 1.47 | 0.014 | 0.0013 | 0.08 | 0.11 | 0.09 | 0.05 | 0.006 | 0.05 | 0.001 | 0.038 | 0.0021 | 0.0027 | 0.21 |

The round billets produced from the various materials were heated to a temperatures of 1100 to 1300° C. by a heating furnace, and were subjected to piercing-rolling in a piercing machine. Further, they were subjected to elongation-rolling in a mandrel mill and then to sizing in a sizer to produce seamless steel pipes with an outer diameter of 323.9 mm and a wall thickness in the range of 11.0 to 40.0 mm.

The seamless steel pipes produced from the various materials were quenched and tempered under the conditions shown in Table 2 to produce steel pipes for line pipe denoted as items A to J.

mm, 2 mm and 3 mm from the inner surface was measured. The Vickers hardness at each measurement point was measured in accordance with JIS Z 2244. The testing force F was 10 kgf (98.07 N). The maximum of the hardness values measured at a total of 6 positions is shown in the column labeled "AsQ hardness" of Table 2.

Tempering was performed where the quenched hollow shell was held at the temperature shown in the column labeled "Tempering temp." of Table 2 for the time shown in "Tempering time".

TABLE 2

| Item | | Material | Quenching temp. (° C.) | Quenching condition | Tempering temp. (° C.) | Tempering time (min.) | TP | AsQ hardness (Hv) | Outer surface layer ferrite | | Inner surface layer ferrite | | Maximum hardness (Hv) | YS (Ma) | TS (MPa) |
|---|---|---|---|---|---|---|---|---|---|---|---|---|---|---|---|
| | | | | | | | | | Presence | Area ratio (%) | Presence | Area ratio (%) | | | |
| A | inv. | 1 | 950 | high-speed cooling | 650 | 128 | 18763 | 326 | present | 40 | present | 11 | 210 | 495 | 565 |
| B | inv. | 2 | 950 | high-speed cooling | 650 | 137 | 18791 | 315 | present | 5 | not present | 0 | 228 | 511 | 579 |
| C | inv. | 3 | 950 | high-speed cooling | 650 | 140 | 18800 | 331 | present | 5 | present | 6 | 228 | 478 | 536 |
| D | comp. | 4 | 950 | low-speed cooling | 650 | 304 | 19110 | 306 | not present | 0 | not present | 0 | 231 | 499 | 569 |
| E | comp. | 5 | 950 | high-speed cooling | 665 | 155 | 19148 | 310 | not present | 0 | not present | 0 | 240 | 521 | 595 |
| F | comp. | 6 | 950 | high-speed cooling | 650 | 155 | 18840 | 325 | not present | 0 | not present | 0 | 233 | 478 | 538 |
| G | comp. | 7 | 950 | low-speed cooling | 650 | 150 | 18827 | 305 | not present | 0 | not present | 0 | 235 | 492 | 548 |
| H | comp. | 1 | 950 | low-speed cooling | 650 | 128 | 18763 | 291 | not present | 0 | not present | 0 | 238 | 521 | 593 |
| I | comp. | 2 | 950 | low-speed cooling | 650 | 137 | 18791 | 298 | not present | 0 | not present | 0 | 240 | 538 | 605 |
| J | comp. | 3 | 950 | low-speed cooling | 650 | 140 | 18800 | 301 | not present | 0 | not present | 0 | 235 | 493 | 550 |

Test specimens for microstructure observation were extracted from the steel pipes for line pipe after tempering and were checked to see whether ferrite was present in the surface layer portions. Further, the area ratio of ferrite in each surface layer portion was measured in accordance with the method described in the embodiments. The presence/non-presence and area ratio of ferrite in the outer and inner surface layer portions are shown in the columns labeled "Outer surface layer ferrite" and "Inner surface layer ferrite" in Table 2.

Test specimens for hardness measurement were extracted from the steel pipes for line pipe after tempering and the Vickers hardness of each of portions between a depth of 1 mm from the outer surface and a depth of 1 mm from the inner surface was measured, where the portions were separated by 1 mm. The maximum of Vickers hardness values measured is shown in the column labeled "Maximum hardness" in Table 2.

From each of the steel pipes for line pipe after tempering, a No. 12 test specimen as defined in JIS Z 2201, with a width of 25 mm and a gauge length of 200 mm was extracted, extending in the longitudinal direction of the steel pipe (i.e. L direction). The extracted test specimens were used to perform tensile tests in accordance with JIS Z 2241 in the atmosphere at room temperature (25° C.) to determine the yield stress and tensile strength. The yield stress was determined by the 0.5% total elongation method. Values of yield stress are shown in the column labeled "YS" in Table 2, and values of tensile strength are shown in the column labeled "TS".

As shown in Table 2, the microstructure of each of the steel pipes for line pipe denoted as items A to C contained ferrite in surface layer portions. The maximum hardness of each of the steel pipes for line pipe denoted as items A to C was 230 Hv or lower.

On the other hand, the steel pipes for line pipe denoted as items D to J contained no ferrite in surface layer portions. The maximum hardness of each of the steel pipes for line pipe denoted as items D to J exceeded 230 Hv.

In the steel pipes for line pipe denoted as items D to F, no ferrite was formed in surface layer portions presumably because the value of Cr+Mo+V was too high. In the steel pipes for line pipe denoted as items G to J, no ferrite was formed in surface layer portions presumably because the maximum hardness in the surface layer portions after quenching was too low.

Figure 5:
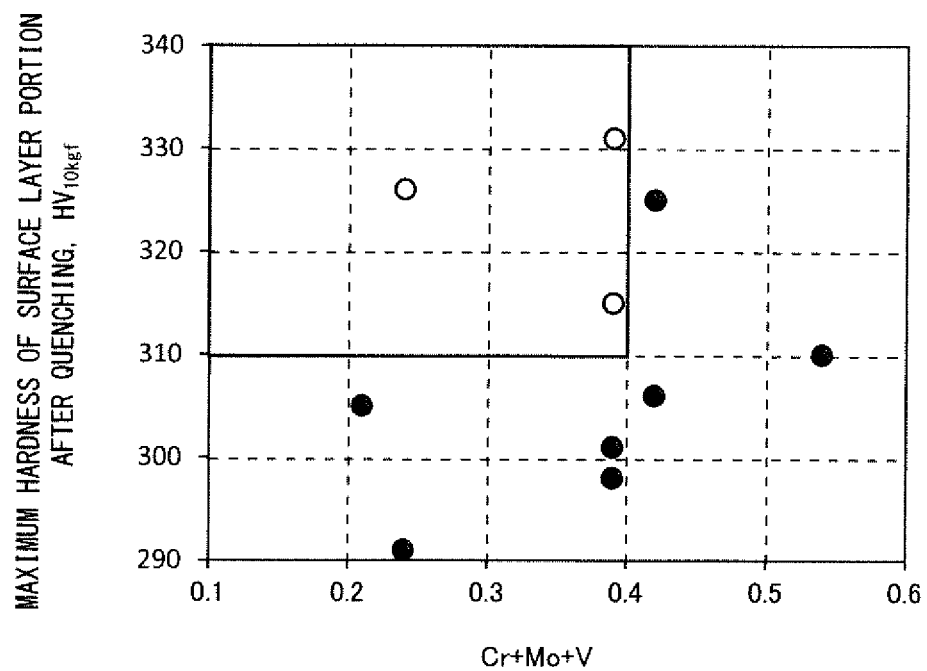
FIG. 5 is a scatterplot illustrating conditions for the formation of ferrite in a surface layer portion.

FIG. 5 is a scatterplot illustrating conditions for the formation of ferrite in a surface layer portion. "○" in FIG. 5 indicates that ferrite was formed, while "●" indicates that no ferrite was formed. FIG. 5 demonstrates that ferrite is formed after tempering if the value of Mo+Cr+V is not higher than 0.40 mass % and the maximum hardness of the surface layer portion after quenching is not lower than 310 Hv.

The invention claimed is:

1. A steel pipe for line pipe, having a chemical composition of, in mass %:
C: 0.02 to 0.11%;
Si: 0.05 to 1.0%;
Mn: 0.30 to 2.5%;
P: up to 0.030%;
S: up to 0.006%;
Cr: 0.05 to 0.36%;
Mo: 0.02 to 0.33%;
V: 0.02 to 0.20%;
Ti: 0.001 to 0.010%;
Al: 0.001 to 0.100%;
N: up to 0.008%;
Ca: 0.0005 to 0.0040%;
Cu: 0 to 1.5%;
Ni: 0 to 1.5%;
Nb: 0 to 0.05%; and
balance Fe and impurities,
the chemical composition satisfying Equation (1) below,
the steel pipe having a microstructure containing tempered martensite and/or tempered bainite and
further containing recrystallized ferrite in at least one of a portion between an outer surface of the steel pipe and a depth of 1 mm from the outer surface, and a portion between an inner surface of the steel pipe and a depth of 1 mm from the inner surface, $$Cr+Mo+V \leq 0.40 \quad (1),$$

wherein each of the chemical symbols in equation (1) is substituted for by the content of the corresponding element in mass %.

2. The steel pipe for line pipe according to claim 1, wherein a Vickers hardness of a portion between a depth of 1 mm from the inner surface and a depth of 1 mm from the outer surface as measured in a wall thickness direction is not higher than 230 Hv.

3. The steel pipe for line pipe according to claim 1, wherein, in a cross section perpendicular to an axial direction of the steel pipe, an area ratio of recrystallized ferrite at at least one of a depth of 1 mm from the outer surface of the steel pipe and a depth of 1 mm from the inner surface of the steel pipe is not lower than 5%.

4. The steel pipe for line pipe according to claim 1, having a yield strength not lower than 415 MPa.

5. The steel pipe for line pipe according to claim 1, wherein the chemical composition includes one or more elements selected from the group consisting of, in mass %:
Cu: 0.05 to 1.5%;
Ni: 0.05 to 1.5%; and
Nb: 0.001 to 0.05%.

6. The steel pipe for line pipe according to claim 2, wherein, in a cross section perpendicular to an axial direction of the steel pipe, an area ratio of recrystallized ferrite at at least one of a depth of 1 mm from the outer surface of the steel pipe and a depth of 1 mm from the inner surface of the steel pipe is not lower than 5%.

7. The steel pipe for line pipe according to claim 2, having a yield strength not lower than 415 MPa.

8. The steel pipe for line pipe according to claim 2, wherein the chemical composition includes one or more elements selected from the group consisting of, in mass %:
Cu: 0.05 to 1.5%;
Ni: 0.05 to 1.5%; and
Nb: 0.001 to 0.05%.

9. The steel pipe for line pipe according to claim 3, having a yield strength not lower than 415 MPa.

10. The steel pipe for line pipe according to claim 3, wherein the chemical composition includes one or more elements selected from the group consisting of, in mass %:
Cu: 0.05 to 1.5%;
Ni: 0.05 to 1.5%; and
Nb: 0.001 to 0.05%.

11. The steel pipe for line pipe according to claim 4, wherein the chemical composition includes one or more elements selected from the group consisting of, in mass %:
Cu: 0.05 to 1.5%;
Ni: 0.05 to 1.5%; and
Nb: 0.001 to 0.05%.

12. The steel pipe for line pipe according to claim 6, having a yield strength not lower than 415 MPa.

13. The steel pipe for line pipe according to claim 6, wherein the chemical composition includes one or more elements selected from the group consisting of, in mass %:
Cu: 0.05 to 1.5%;
Ni: 0.05 to 1.5%; and
Nb: 0.001 to 0.05%.

14. The steel pipe for line pipe according to claim 7, wherein the chemical composition includes one or more elements selected from the group consisting of, in mass %:
Cu: 0.05 to 1.5%;
Ni: 0.05 to 1.5%; and
Nb: 0.001 to 0.05%.

15. The steel pipe for line pipe according to claim 9, wherein the chemical composition includes one or more elements selected from the group consisting of, in mass %:
Cu: 0.05 to 1.5%;
Ni: 0.05 to 1.5%; and
Nb: 0.001 to 0.05%.

16. The steel pipe for line pipe according to claim 12, wherein the chemical composition includes one or more elements selected from the group consisting of, in mass %:
Cu: 0.05 to 1.5%;
Ni: 0.05 to 1.5%; and
Nb: 0.001 to 0.05%.

17. A method of manufacturing a steel pipe for line pipe, comprising:
preparing a hollow shell having a chemical composition of, in mass %: C: 0.02 to 0.11%; Si: 0.05 to 1.0%; Mn: 0.30 to 2.5%; P: up to 0.030%; S: up to 0.006%; Cr: 0.05 to 0.36%; Mo: 0.02 to 0.33%; V: 0.02 to 0.20%; Ti: 0.001 to 0.010%; Al: 0.001 to 0.100%; N: up to 0.008%; Ca: 0.0005 to 0.0040%; Cu: 0 to 1.5%; Ni: 0 to 1.5%; Nb: 0 to 0.05%; and balance Fe and impurities;

quenching the hollow shell such that at least one of a maximum Vickers hardness of a portion between an outer surface of the hollow shell and a depth of 1 mm from the outer surface, and a maximum Vickers hardness of a portion between an inner surface of the hollow shell and a depth of 1 mm from the inner surface is not lower than 310 Hv; and tempering the quenched hollow shell, the chemical composition satisfying Equation (1) below, $$Cr+Mo+V \leq 0.40 \qquad (1),$$

wherein each of the chemical symbols in equation (1) is substituted for by the content of the corresponding element in mass %.

18. The method of manufacturing a steel pipe for line pipe according to claim 17, wherein a tempering parameter TP defined by Equation (2) below is not higher than 18800, $$TP=(T+273) \times (20+\log(t)) \qquad (2),$$

where T is the tempering temperature and t is the holding time for that temperature, and the unit of T is ° C. and the unit of t is the hour.

19. The method of manufacturing a steel pipe for line pipe according to claim 17, wherein the chemical composition includes one or more elements selected from the group consisting of, in mass %:
Cu: 0.05 to 1.5%;
Ni: 0.05 to 1.5%; and
Nb: 0.001 to 0.05%.

20. The method of manufacturing a steel pipe for line pipe according to claim 18, wherein the chemical composition includes one or more elements selected from the group consisting of, in mass %:
Cu: 0.05 to 1.5%;
Ni: 0.05 to 1.5%; and
Nb: 0.001 to 0.05%.

* * * * *